United States Patent [19]

Igarashi

[11] Patent Number: 4,903,277

[45] Date of Patent: Feb. 20, 1990

[54] ELECTRIC MELTING FURNACE WITH PARTITIONED MELTING CAVITY FOR SOLIDIFYING HIGHLY RADIOACTIVE WASTE IN GLASS

[75] Inventor: Hiroshi Igarashi, Ibaraki, Japan

[73] Assignee: Doryokuro Kakeunenryo Kaihatsu Jigyodan, Tokyo, Japan

[21] Appl. No.: 233,624

[22] Filed: Aug. 18, 1988

[30] Foreign Application Priority Data

Aug. 21, 1987 [JP] Japan .................. 62-207570

[51] Int. Cl.$^4$ .............................. C03B 5/027
[52] U.S. Cl. ........................ 373/30; 373/31; 373/33
[58] Field of Search .............. 373/27, 29, 30, 31, 373/32, 33, 35, 122; 252/629, 628

[56] References Cited

U.S. PATENT DOCUMENTS

| | | | |
|---|---|---|---|
| 972,779 | 10/1910 | Sauvageon | 373/31 |
| 2,280,101 | 4/1942 | Slayter et al. | 373/31 |
| 4,627,069 | 12/1986 | Harvey et al. | 373/35 |

*Primary Examiner*—Roy N. Envall, Jr.
*Attorney, Agent, or Firm*—Armstrong, Nikaido, Marmelstein, Kubovcik & Murray

[57] ABSTRACT

An electric melting furnace for solidifying highly radioactive waste in glass has a melting cavity made of a non-conductive refractory and adapted to melt a raw material consisting of highly radioactive waste and a glass material by passing a current between horizontally opposing electrodes, and to extract the molten glass material through a plurality of outlet ports at a bottom portion of the furnace, the melting cavity being partitioned by a non-conductive partitioning refractory provided on the bottom portion of the furnace between outflow ports. Since the furnace is so structured that the melting cavity is partitioned by the non-electrically conductive refractory, all current lines connecting the pair of electrodes for melting the highly radioactive waste, which contains elements of the platinum group, detour around the partitioning refractory. According to the current line distribution produced, it is just as if the electrodes were located on the upper side of the refractory as seen from each section of the partitioned melting cavity. This makes it possible to prevent the current flowing between the electrodes from concentrating in deposits which collect at the furnace bottom and contain the platinum-group elements in high concentration. It is also possible to reduce melting cavity depth in comparison with the melt surface area and inter-electrode distance.

8 Claims, 5 Drawing Sheets

ELECTRIC MELTING FURNACE WITH PARTITIONED MELTING CAVITY FOR SOLIDIFYING HIGHLY RADIOACTIVE WASTE IN GLASS

BACKGROUND OF THE INVENTION

This invention relates to an electric melting furnace for glass-solidification of highly radioactive waste generated at a nuclear fuel reprocessing plant.

The waste generated at a nuclear fuel reprocessing plant ordinarily is a liquid and is highly radioactive. In order to safely isolate this waste from the human environment for an extended period of time, solidification technology has been developed for forming the waste and a glass material into molten glass by heating at high temperature, and sealing the glass in canisters in solidified form.

More specifically, the highly radioactive waste is subjected to suitable pretreatment, after which the waste, usually in the form of liquid, is fed into an electric melting furnace (hereinafter referred to as a "melter") together with the glass raw material. The highly radioactive waste and the glass material are formed into high-temperature molten glass within the melter. Metal vessels, namely the canisters referred to above, are filled with the molten glass continuously or intermittently. The canisters so charged with the glass are sealed and kept temporarily at a storage facility before being buried deep within the earth for permanent disposal.

The highly radioactive waste and the glass raw material (the combination of which shall hereinafter be referred to simply as the "raw material" where appropriate) continuously fed into the melter attain a state covering the molten glass surface of a melting cell made of brick. Owing to heat flow from the molten glass, evaporation of the water content in the waste, provisional combustion and a glass-forming reaction occur continuously, so that the raw material mixes with the already existing molten glass to form homogeneous glass.

The energy needed to maintain the molten glass at a high temperature is supplied by passing a current across at least a pair of opposing electrodes arranged in the molten glass to subject the molten glass between these electrode to Joule's heating.

In order to prevent the operator from being exposed to radiation, the melter is placed in a space referred to as a cell and operation, maintenance and exchange are performed by remote handling. Accordingly, the melter is designed so as to be as small in size and light in weight as possible. The conventional melter for technical development used in solidifying highly radioactive waste in glass also is designed so as to make the volume of the melting cavity as small as possible. That is, the depth of the melting cavity is made as small as the emplacement of the aforementioned electrodes will allow, and the bottom of the melting cavity is designed to be substantially horizontal to reduce the volume of the cavity.

Highly radioactive waste contains such elements of the platinum group as Ru, Pb and Rh. These elements do not readily dissolve in glass and have a high specific gravity. As a result, they deposit and built up on the bottom of the melting cavity. Among these elements of the platinum group, Pd and Rh are reduced in glass and are present as metals. Ru is present as a metal or as $RuO_2$ crystal.

Though $RuO_2$ is an oxide, it is known to be an excellent conductor and is a substance which finds use in electrically conductive pastes for electronic components. The metals of reduced Pd and Rh naturally are good electrical conductors. When these substances accumulate at the bottom of the furnace in high concentration, the high-temperature resistivity value of the glass near the bottom of the furnace is small in comparison with that of the glass at the upper part of the furnace. (The glass in the vicinity of the furnace bottom that contains the platinum-group elements in high concentration shall be referred to as "sludge" hereinafter.)

When the elements of the platinum group deposit on the furnace bottom and form an excellent electrically conductive layer in the melter of the conventional design having the shallow melting cavity, the electric current that flows between the electrodes concentrates at the bottom of the furnace, thereby causing an abnormal rise in the temperature at the furnace bottom and, conversely, a drop in the glass temperature at the surface of the melting cavity. The result is a decline in the efficiency at which the raw material is melted. Since the bottom surface of the melting cavity is substantially horizontal, moreover, the platinum-group elements that have deposited on the furnace bottom do not flow into the canister along with the glass and these continue to accumulate on the bottom until operation of the melter can no longer be maintained.

In order for highly radioactive waste containing platinum-group elements to be melted with glass in a stable manner by means of the melter using the Joule's heating method, it is necessary that the melter possess the following two functions:

(1) Since elements of the platinum group are not readily soluble in glass and exhibit a specific gravity of 10 or higher as opposed to the specific gravity (usually 2.5) of a glass melt, these elements quickly settle within the glass melt and deposit on the furnace bottom. The glass containing these platinum-group elements in high concentration, namely the aforementioned sludge, has a high-temperature resistivity lower than that of the glass at the upper portion of the furnace. Therefore, when the melting of the highly radioactive waste with glass begins, a highly electrically conductive layer forms in a short period of time.

Accordingly, it is required that the melter for solidifying the highly radioactive waste in glass be designed to have a structure in which operation is capable of continuing without impediment even if a highly conductive layer is present do some degree on the furnace bottom. In other words, the structure should be such that the current flowing between the electrodes does nor concentrate selectively at the bottom of the furnace.

(2) It is stated above in (1) that the melter design should be such that the electrode arrangement enables operation to continue even if a highly electrically conductive layer is present to some degree on the furnace bottom. However, if sludge remains inside the melting cavity when the glass is charged into the canister, and if the sludge keeps on accumulating, then this will naturally impede the heating caused by enerigization of the electrodes.

Accordingly, it is required to adopt a melter design in which the furnace bottom is inclined so that sludge will flow down to an outflow port in order that the deposit may be removed on a scheduled or non-scheduled basis.

Two patent applications relating to the furnace bottom configuration of a melting cavity are disclosed in Japanese Patent Application Laid-Open (KOKAI) Nos. 57-196726 and 57-19727. These two applications deal with the furnace bottom shape of an ordinary commercial glass melting furnace. They facilitate the changing of glass texture and provide a funnel-shaped bottom having an inclination of 3°–45° to prevent the furnace bottom refractory from being attacked by lead produced when lead glass is melted. Thus, both of these patent applications deal with the productivity and service life of a furnace but are silent with regard to electrode arrangement. Japanese Patent Application No. 60-275595 has as its object to prevent the electrical ill effects of the platinum-group elements. In order to prevent the concentration of electric current in the furnace bottom deposit, this application proposes making the distance between the glass outflow port opening in the furnace and the lower ends of at least a pair of electrodes, which are for supplying the major portion of the electric power necessary to melt the glass, no less than one-half the distance between the electrodes. If the glass melting capability of the melter (namely the amount of waste treated or the amount of glass manufactured per unit time) is to be increased, it is generally required that the area of the molten glass exposed at the top (which area shall be referred to as the "melt surface area" hereinafter) be increased. This is accompanied by an increase in the distance between the electrodes. Therefore, in accordance with the prior-art method disclosed in this patent application, the distance between the lower ends of the electrodes and the outflow port opening in the furnace is increased in proportion to the inter-electrode distance, and the depth of the melting cavity is increased as well. In other words, owing to the increase in the melting capability of the melter, there is an increase in the external dimensions of the melter and in the overall weight. This makes it necessary to furnish more space for installation and to provide a crane having greater capability for handling the melter in a melter facility for highly radioactive waste solidification. Moreover, if the melting cavity is provided with greater depth, the amount of glass to be heated will increase and it will be required to augment the heating apparatus.

The present invention seeks to solve the aforementioned problems and, to this end, partitions the portion of a melting cavity below the upper ends of the electrodes by means of an electrically non-conductive refractory (non-conductive partitioning refractory hereinafter), and makes the distance between the lower ends of the electrodes and an outflow port opening inside the furnace no less than one-half the distance between the partitioning refractory and the electrode closest thereto. This method of preventing the concentration of electric current in sludge differs from that of the abovementioned patent application. A glass outflow port is provided in each section of the melting cavity partitioned by the partitioning refractory, and a refractory having an incline is provided about the periphery of each outflow port. As a result, sludge flows out from the outflow port along the incline of the refractory, thereby preventing the deposits from building up. In accordance with the method of the invention, the melt surface area is enlarged to raise the treatment capability of the melter. Even if the inter-electrode distance is increased, melting cavity depth can be made one-half or more than one-half the electrode-partitioning refractory distance, which can be set at will. Thus, the depth of the melting cavity can be held below a fixed depth even if the treatment capability of the melter is raised. This makes it possible to reduce the external dimensions and total weight of the melter by an amount corresponding to the reduction in melting cavity depth. Furthermore, since the amount of retained glass to be heated can be reduced in comparison with the case when the method of the invention is not employed, the amount by which the heating apparatus must be augmented is kept small.

Further, in accordance with the invention, the glass melting furnace is provided with a plurality of glass outflow ports and freeze valves. By reducing the operating frequency per freeze valve, the load per freeze valve is decreased. This makes it possible to enhance the reliability and extend the service life of the overall glass melting furnace. Further, the partitioning refractory is equipped with a communication pipe. Thus, if a freeze valve should fail, the glass in the melting cavity can still be extracted by operation of the freeze valves that are not malfunctioning.

SUMMARY OF THE INVENTION

Accordingly, an object of the present invention is to provide an electric melting furnace with a partitioned melting cavity for solidifying highly radioactive waste in glass, wherein electric current is prevented from concentrating in deposits near the furnace bottom and the depth of the melting cavity can be reduced in comparison with the melt surface area and the distance between electrodes.

In accordance with the present invention, the foregoing object is attained by providing an electric melting furnace for solidifying highly radioactive waste in glass, the furnace having a melting cavity comprising a non-conductive partitioning refractory and so adapted as to melt a raw material consisting of highly radioactive waste and a glass raw material by passing a current between electrodes arranged to oppose each other in the horizontal direction, and to extract the melted raw material through an outflow port at a bottom portion of the furnace, characterized in that a plurality of the outflow ports are provided, and the melting cavity is partitioned by disposing a non-conductive partitioning refractory on the bottom portion of the furnace between outflow ports.

Thus, the electric melting furnace of the invention is so structured that the melting cavity is partitioned by the non-conductive partitioning refractory. As a result, all current lines connecting the pair of electrodes for melting the highly radioactive waste containing platinum-group elements detour around the partitioning refractory. According to the current line distribution produced, it is just as if the electrodes were located on the upper side of the refractory as seen from each section of the partitioned melting cavity. This makes it possible to prevent the current flowing between the electrodes from concentrating in the deposits at the furnace bottom and containing the platinum-group elements in high concentration. It is also possible to reduce melting cavity depth in comparison with the melt surface area and inter-electrode distance.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
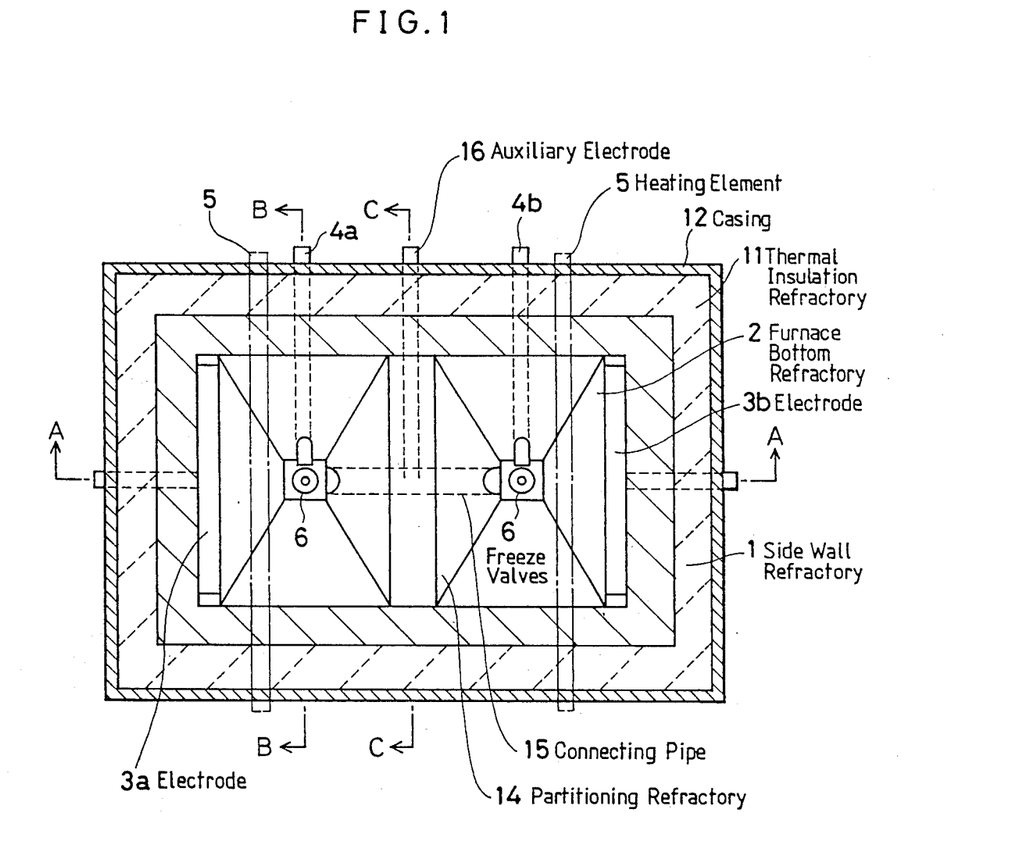
FIG. 1 is a plan view of an embodiment in which the melting cavity of a melter according to the invention is partitioned into two or more cavities by a non-conductive partitioning refractory.
Figure 2:
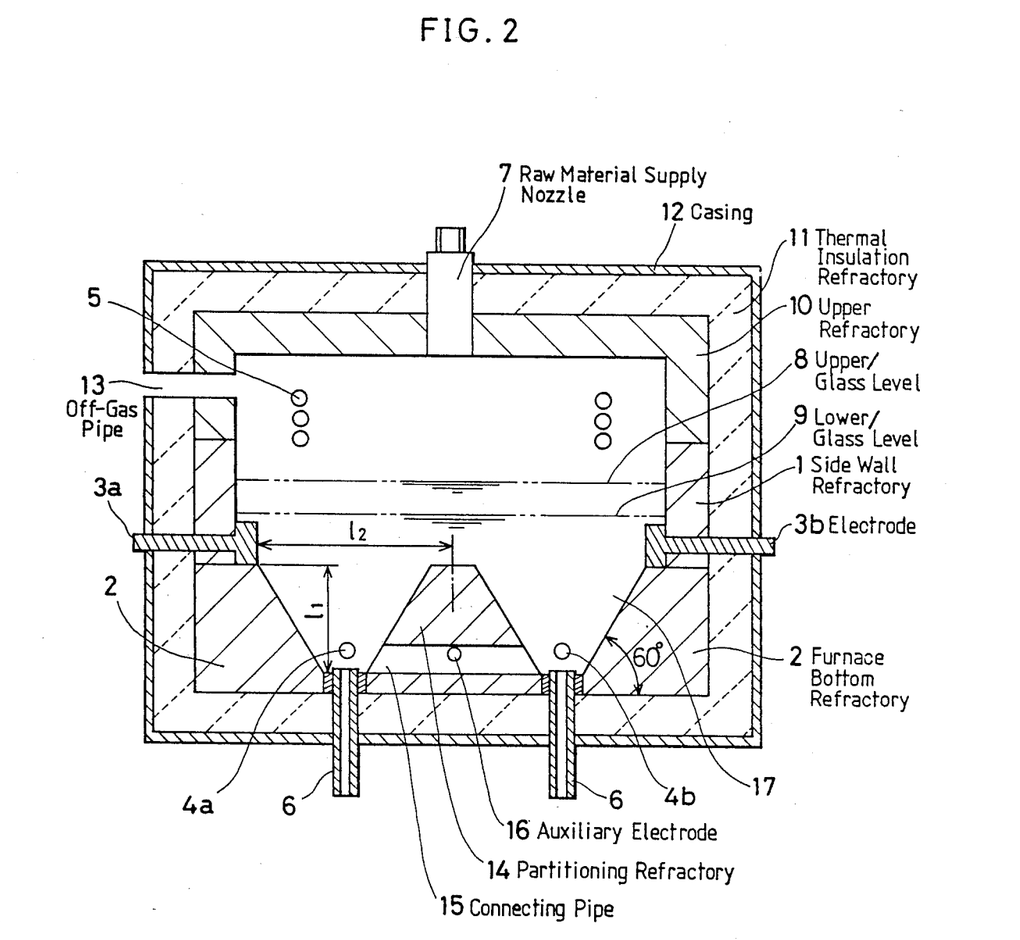
FIGS. 2 through 4 are sectional views taken respectively along lines A—A, B—B and C—C of FIG. 1.
Figure 3:
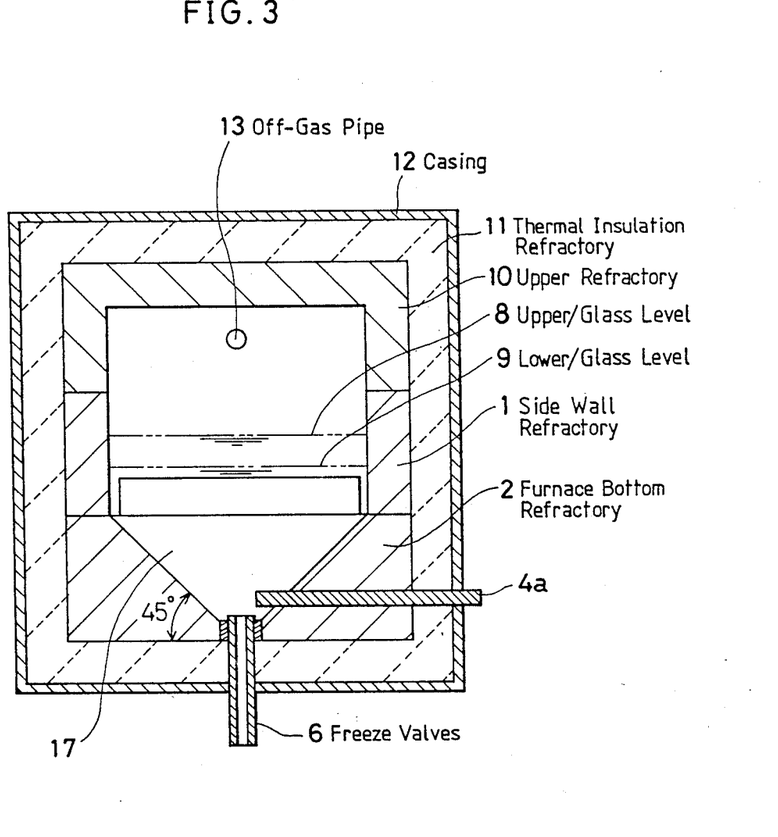
Figure 4:
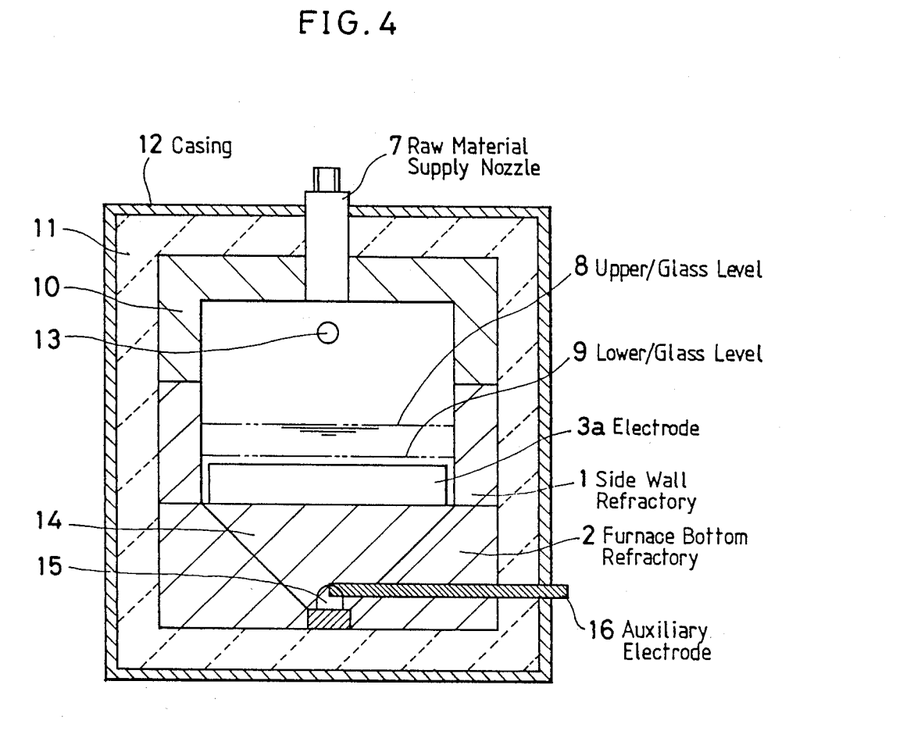

An embodiment of the present invention will now be described with reference to the drawings, in which FIGS. 1 through 4 illustrate an embodiment in which the melting cavity of a melter according to the invention is partitioned into two or more cavities by a non-electrically conductive refractory. FIG. 1 is a plan view, and FIGS. 2 through 4 are sectional views taken respectively along lines A—A, B—B and C—C of FIG. 1. The Figures show a side wall refractor 1, a furnace bottom refractory 2, electrodes 3a, 3b, auxiliary electrodes 4a, 4b, a resistance heating element 5, freeze valves 6, a raw material supply nozzle 7, an upper glass level 8, a lower glass level 9, an upper refractory 10, a thermal insulation refractory 11, a casing 12, an off-gas pipe 13, a partitioning refractory 14, a connecting pipe 15, an auxiliary electrode 16 and a melting cavity 17.

The side wall retractory 1 forming the side wall of the melting cavity 17 usually employs a refractory material that is highly resistant to attack by molten glass. The freeze valves 6, which are made of metal, are mounted in a plurality of glass outflow ports at the bottom of the melting cavity. Two of the freeze valves 6 are provided in the illustrated embodiment. The furnace bottom refractory 2 is arranged about the periphery of of the freeze valves 6 and, like the side wall refractory 1, employs a refractory material that is highly resistant to attack by molten glass. The partitioning refractory 14 partitions the melting cavity into two sections in the illustrated embodiment. The partitioning refractory 14 employs a highly non-electrically conductive refractory material highly resistant to attack by molten glass, with the amount of heat generated by the partitioning refractory 14 being sufficiently small in comparison with that generated by the glass in the melting cavity due to the passage of electric current. The furnace bottom refractory 2 and the partitioning refractory 14 are inclined toward the freeze valves 6 at an angle of 30°–70° with respect to the horizontal. In the illustrated embodiment, inclinations of 45° and 60° are combined. The freeze valves 6 are provided for the purpose of permitting and terminating the outflow of molten glass. The freeze valves 6 are heated as by passing a current through a metal cylinder.

The opposing electrodes 3a, 3b are for supplying energy needed to maintain a temperature suitable for melting the glass material. Though only a pair of these electrodes is shown in the illustrated embodiment, a plurality of pairs can be provided. The electrodes 3a, 3b are arranged at such a height that the distance $l_1$ between a line connecting the lower ends of the electrodes 3a, 3b and the glass outflow port opening at the bottom of the furnace is no less than one-half the distance $l_2$ between the partitioning refractory 14 and the electrode 3a or 3b nearest to this refractory. The auxiliary electrodes 4a, 4b serve to regulate the glass temperature above the freeze valves 6, a current being passed between the electrodes 3a, 4a and 3b, 4b. The connecting pipe 15 is so adapted that the molten glass can pass between the partitioned, mutually adjacent melting cavity sections. The auxiliary electrode 16 heats the molten glass in the connecting pipe 15 to a temperature suitable for flow through the pipe. To this end, a current is passed between the auxiliary electrode 16 and the auxiliary electrode 4a or 4b.

A space is formed at the upper portion of the melting cavity by the upper refractory 10. The thermal insulation refractory 11 optimizes the heat retention of the melter. The metallic casing 12 is provided for the purpose of preventing radioactive substances from leaking out of the melter. The resistance heating element 5 serves to raise temperature when the melter is started. The raw material supply nozzle 7 is for supplying the melter with the highly radioactive waste and glass material. The off-gas pipe 13 is for introducing the off-gas, which is produced when the raw material is melted, to an off-gas processing apparatus.

When operation is started, enough glass raw material is supplied to conceal the electrodes 3a, 3b, after which the resistance heating element 5 is supplied with electric power to gradually raise the temperature in the space at the upper portion of the melting cavity. When this temperature rises to 1000° C., the glass raw material near the surface of the melting cavity melts. Though glass is an electrical insulator at low temperatures, it will gradually allow electricity to pass therethrough as temperature rises and the molten state is attained. By utilizing this property, a voltage is impressed across the electrodes 3a, 3b to pass a current through the glass, whereby the glass itself is caused to produce heat (referred to as direct energization). The electric power of this direct energization is gradually increased to render molten all of the glass raw material fed into the melting cavity. When this state is attained, the glass temperature can be maintained without heat produced by the resistance heating element. Accordingly, heating by the resistance heating element 5 is terminated. The electric power is regulated in such a manner that a glass temperature is attained that is suitable for melting the glass material by direct energization. At the same time, a current is passed between the electrodes 4 and the electrode 3a or 3b to regulate the glass temperature at the portion above the freeze valves 6. At the moment this is completed, the highly radioactive waste and the glass raw material are supplied from the raw material supply nozzle 7.

There are two methods through which glass may be charged into a canister. One allows the glass to overflow in a continuous manner in order to fill the canister. In the other, freeze valves are provided on the furnace bottom or at suitable positions and the glass is caused to flow down through these valves periodically.

The freeze valves 6 for removal of the elements of the platinum group can be used as these freeze valves for charging the glass into a canister. In order to simplify the description, the glass is charged into a canister periodically using the freeze valves 6 in the embodiment of FIGS. 1 through 4. In other cases it is necessary to remove the platinum-group elements using the freeze valves 6 as the conditions warrant.

When the continuously supplied raw material reaches a glass level suitable for being charged into a cansister (the high glass level 8 in FIGS. 2, 3 and 4 corresponds to such a level), the freeze valves 6 are heated to charge the glass into the canister. When a predetermined amount of the molten glass has been charged into the canister, heating of the freeze valves 6 is halted, whereupon the temperature of the glass passing through the freeze valves 6 drops. As a result, the glass in the freeze valves eventually solidifies and stops flowing out. In urgent cases the glass in the freeze valves 6 can be hardened rapidly as by applying jets of air or water. When the charging of the glass into the canister is completed, the glass level in the melting cavity drops to the low glass level 9. The operation of the freeze valves 6 can be performed simultaneously by a plurality of freeze valves in concert or alternatingly. If the freeze valves 6 are operated in an alternating manner, a current is passed the auxiliary electrode 16 and auxiliary electrode 4a or 4b to effect heating, and the glass in the cavity near the freeze valve that does not permit outflow will flow through the connecting pipe 15 and out the operating freeze valve. When additional raw material is subsequently supplied to raise the glass level to the upper glass level 8, the outflow of the molten glass is repeated.

When the glass is charged into a canister by the platinum-family removal valves 6 as in the above-described embodiment, the elements of the platinum group are removed at each charging operation.

In the other charging method in a case where locations other than the furnace bottom are provided with freeze valves, or in a case where the overflow method is adopted, it is necessary as conditions warrant to remove the elements of the platinum group from the furnace bottom by using the freeze valves 6, as mentioned earlier. In either case, the adverse effects on electrical conditions caused by the elements of the platinum group can be eliminated and melter operation can be proceed without impediment.

It should be noted that an arrangement can be adopted in which sludge is drawn out from above by suitable means substituted for the freeze valves 6.

The present invention has the following advantages:

(1) Size reduction of the melting furnace

By adopting a structure in which the melting cavity is partitioned by the non-conductive refractory up to a line connecting the pair of electrodes, all current lines connecting the pair of electrodes detour around the partitioning refractory. According to the current line distribution produced, it is just as if the electrodes were located on the upper side of the partitioning refractory as seen from each section of the partitioned melting cavity. Therefore, if the melting furnace is partitioned by refractories into n sections in order to prevent current from concentrating in the sludge, the distance between the lower ends of the electrodes and the glass outflow port opening inside the furnace need not be made one-half or more of the inter-electrode distance as in the prior art. Rather, in accordance with the invention, it will suffice if the distance between a straight line connecting the lower ends of the two electrodes and the outflow port opening in the furnace is made no less than one-half the distance between the partitioning refractory and the electrode nearest thereto, or no less than one-half the distance between the centers of the partitioning refractories on both sides of the opening.

Figure 5:
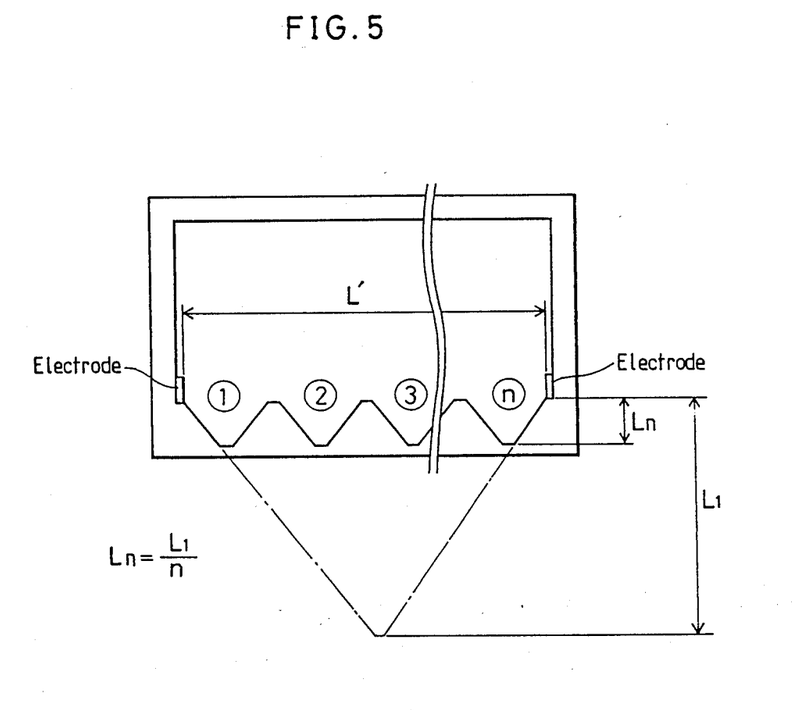
FIG. 5 is a view useful in describing the manner in which the depth of the melting cavity can be reduced.

By comparing melting cavities having the same inter-electrode distance, it is seen that if the cavity is partitioned into n sections by partitioning refractories, as illustrated in FIG. 5, the depth of the melting cavity can be reduced to at least 1/n in comparison with a cavity that is not partitioned. More specifically, in FIG. 5, let $L'$ represent the distance between electrodes which supply the major portion of the power necessary for melting the glass, and let $L_1$ represent the distance between the lower ends of the electrodes and the glass outflow port opening inside the furnace at the bottom thereof in a case where the melting cavity is not partitioned. In order to prevent current from concentrating in the furnace bottom deposit, it is required that $L_1$ be no less than $L'/2$. On the other hand, in a case where the melting cavity is partitioned, let $L_n$ represent the distance between a straight line connecting the lower ends of the two electrodes and the glass outflow port opening inside the furnace at the bottom thereof. In this case, $L_n$ need only be $L'/2n$ or greater in order to prevent the current from concentrating in the sludge.

Further, since each partitioned melting cavity section is provided with the glass outflow port and the refractory surrounding each outflow port slants toward the outflow port at an inclination of 30°–70° with respect to the horizontal, the deposits flow downwardly along the inclined surfaces of the refractory and can be extracted from the glass outflow ports.

(2) Improved reliability and prolonged service life of the melting furnace

Since each partitioned melting cavity section is provided with the glass outflow port and freeze valve, the amount of glass outflow per freeze valve and the frequency of use of each freeze valve are reduced in inverse proportion to the number of freeze valves with regard to a predetermined amount of glass outflow for the melter as a whole. This is superior to a melter having a glass outflow port and freeze valve at only one location. Since a freeze valve is a component that has a major influence upon melter lifetime, overall melter reliability can be enhanced and service life prolonged by reducing the load on each freeze valve in the manner mentioned above.

(3) Easier melting furnace maintenance

The connecting pipe is provided in the partitioning refractory in such a manner that the molten glass is capable of moving between the mutually adjacent melting sections obtained by partitioning. Therefore, even if one freeze valve malfunctions and can no longer permit the molten glass to flow out, the molten glass on this side is capable of flowing through the connecting pipe and out the functioning freeze valve. This makes it possible to continue operation using only the functioning freeze valve and enables the glass on the side of the malfunctioning freeze valve to be extracted before the melting furnace is discarded. The latter feature is particularly advantageous since it contributes to a reduction in the amount of secondary radioactive waste generated and makes it easier to handle the discarded melting furnace.

As many apparently widely different embodiments of the present invention can be made without departing from the spirit and scope thereof, it is to be understood that the invention is not limited to the specific embodiments thereof except as defined in the appended claims.

What we claimed is:

1. An electric melting furnace for solidifying highly radioactive waste into glass, comprising:
   a melting cavity having a bottom portion;
   a plurality of outflow ports disposed in the bottom portion of the melting cavity for extracting molten glass;
   at least one pair of opposing electrodes positioned on opposite side walls of the melting cavity; and
   at least one non-electrically conductive partitioning refractory disposed between the outflow ports to partition said melting cavity.

2. The electric melting furnace according to claim 1, wherein said non-electrically conductive partitioning refractory is disposed so that an upper end thereof is situated at least below a horizontal line connecting like portions of said electrodes.

3. The electric melting furnace according to claim 1, wherein the length of a vertical distance from the lowest points of the opposing electrodes to the opening of an outflow port, positioned between partitioning refractories, is no less than one-half the horizontal distance between the centers of the partitioning refractories on both sides of said opening.

4. The electric melting furnace according to claim 1, wherein said outflow port is provided with a freeze valve.

5. The electric melting furnace according to claim 1, further comprising a bottom portion surrounding an opening of said outflow port inside said melting cavity and having an inclination of 30°–70° with respect to a horizontal plane, the inclination being directed outwardly of said melting cavity and leading to said opening.

6. The electric melting furnace according to claim 1, wherein said non-electrically conductive partitioning refractory has a through-hole passing through the bottom portion of the melting cavity.

7. The electric melting furnace according to claim 6, further comprising an auxiliary heating electrode inside said through-hole.

8. The electric melting furnace according to claim 1 wherein a vertical distance from the lowest point of one of said electrodes to a nearest outflow port is no less than one-half of a horizontal distance between a center of said at least one partitioning refractory to a nearest point of said one electrode.

* * * * *

UNITED STATES PATENT AND TRADEMARK OFFICE
CERTIFICATE OF CORRECTION

PATENT NO. : 4,903,277
DATED : February 20, 1990
INVENTOR(S) : Hiroshi IGARASHI

It is certified that error appears in the above-identified patent and that said Letters Patent is hereby corrected as shown below:

On the cover page, Item [73], "Doryokuro Kakeunenryo Kaihatsu Jigyodan" should read --Doryokuro Kakunenryo Kaihatsu Jigyodan--.

Signed and Sealed this

Fourteenth Day of May, 1991

*Attest:*

HARRY F. MANBECK, JR.

*Attesting Officer*      *Commissioner of Patents and Trademarks*